United States Patent

[11] 3,617,872

| | | |
|---|---|---|
| [72] | Inventor | Donald A. Senour<br>Carlisle, Mass. |
| [21] | Appl. No. | 817,809 |
| [22] | Filed | Apr. 21, 1969 |
| [45] | Patented | Nov. 2, 1971 |
| [73] | Assignee | BLH Electronics, Inc.<br>Waltham, Mass. |

[54] AC TO DC HIGH-ACCURACY LOW-LEVEL VOLTAGE MEASURING SYSTEM
5 Claims, 2 Drawing Figs.

[52] U.S. Cl.......................................... 324/57,
73/88.5, 324/123
[51] Int. Cl..................................................... G01r 27/00
[50] Field of Search........................................... 324/57, 62,
990, 100, 140, 140 R, 123; 323/75 N; 73/144, 88.5

[56] References Cited
UNITED STATES PATENTS

| 2,999,206 | 9/1961 | Stoddart et al. | 324/140 |
| 3,098,194 | 7/1963 | Clemens | 323/75 |
| 3,193,762 | 7/1965 | Wu | 324/62 |
| 3,416,076 | 12/1968 | Clinton | 324/57 |

*Primary Examiner*—Edward E. Kubasiewicz
*Attorney*—Thomson & Mrose

ABSTRACT: An AC to DC system is provided for measuring with high accuracy the low-level output voltage signals from an AC—excited Wheatstone—bridge-type circuit arrangement including electrical strain-responsive elements in its arms. In such a circuit arrangement, output voltages from the initially balanced bridge will be caused by a change in impedance of the strain-responsive elements due to external influences which are to be measured. The output signals from the bridge circuit arrangement are operationally amplified, demodulated to DC, and then read by a digital indicator, such as a digital voltmeter, to give an indication proportional to the to-be-measured influences upon the electrical strain responsive elements. A second demodulator may be used to compensate for system lead resistance and any demodulator inaccuracy, by using the output thereof to control the AC excitation applied to the bridge circuit arrangement input. The second demodulator output may also be directly applied as a reference input for a ratiometer-type digital indication. In one particular application, the strain-responsive elements are mounted as part of a load cell or transducer, and, when loads are applied to the same, the system output indications will be accurately related to the applied load.

FIG. I

INVENTOR:
DONALD A. SENOUR

BY Thomson, Wrose & Ericson
ATTORNEYS

INVENTOR:
DONALD A. SENOUR

AC TO DC HIGH-ACCURACY LOW-LEVEL VOLTAGE MEASURING SYSTEM

BACKGROUND OF THE INVENTION

The present invention relates to improvements in the measurement of low-level voltage signals and in one particular aspect to a novel and improved system for measuring with high accuracy small-level output signals, such as signals in the microvolt range from a bridge-circuit arrangement which includes transducive strain-responsive elements in the arms thereof, through unique exploitation of AC amplification, demodulation to DC and digital readout.

In certain applications it is important to be able to measure with high accuracy the output from a bridge-circuit arrangement including strain-responsive elements in the arms thereof. For example, in weighing, conventional load cells having electrical strain-responsive elements mounted thereon, such for example as of the wire, foil, semiconductor or the like type, and connected in a bridge-circuit arrangement, are commonly used to indicate the weight of a load by measuring the output signals from an initially balanced bridge-circuit arrangement. Any output voltage generated will be in proportion to the change in impedance of the transducive electrical strain-responsive elements upon the application of a load to the load cell. A typical load cell device employing electrical strain-responsive elements mounted thereon and connected in a bridge circuit arrangement is disclosed in U.S. Pat. No. 3,004,231 Laimins. A typical weighing support apparatus for the same is disclosed in U.S. Pat. No. 2,793,851.

In the past, one practice in measuring the output voltage signal from a bridge-circuit arrangement including electrical strain-responsive elements mounted in the arms thereof involved exciting the bridge circuit with a DC voltage signal. The output voltage from the bridge-circuit arrangement due to an unbalance thereof, being DC. was then amplified by a DC amplifier and read by a DC digital voltmeter. This type of practice has been found to be deficient in the measurement of extremely small voltage levels, such as those below 10 milivolts. Among the problems are those associated with noise due to flicker and thermocouple effects in the components of conventional DC amplifiers; in addition, such conventional DC amplifiers have tendency to drift. High-accuracy measurement of small voltage levels thus becomes impossible, since the noise level, and the drift can produce voltage changes which are as high as those desired to be measured.

It has also been known to attempt to measure the small-level voltage output, from a bridge-circuit arrangement which includes electrical strain-responsive elements mounted in the arms thereof, by first applying an AC excitation signal to the input of the bridge circuit, and then applying the AC output to a null balance servo-type system, the output voltage of which was to be read upon a conventional digital counter, dial readout, or the like. This type of servo-type system, being electromechanical in nature, tended to be extremely slow in operation, and subject to wear and other problems associated with servo-driven balance equipment.

SUMMARY OF THE INVENTION

Accordingly, one object of the present invention is to provide a novel and improved system for the high-accuracy rapid-response measurement of low-level signals.

Another object of the subject invention is to provide a unique and advantageous AC-to-DC high-accuracy system for measuring low-level voltage signals, particularly those signals from a bridge-circuit arrangement having bridge-circuit strain-responsive elements mounted in the arms thereof.

Further, it is an object of this invention to provide a novel and advantageous system for uniquely and precisely measuring and displaying the low-level voltage output signal from a bridge-circuit arrangement which uses solid state circuitry having no moving parts and accordingly, provides rapid indication.

One other object of the invention is to provide a new and improved AC-to-DC high-accuracy low-level voltage measuring system for accurately measuring the force applied to a load cell including transducive strain-responsive elements mounted thereon and connected in a Wheatstone bridge-circuit arrangement whereby the voltage measured is proportional to the weight of the force-applying load.

By way of a summary account of practice of this invention in one of its aspects, a load cell including transducive elements mounted on a sensing element and connected in a bridge-circuit arrangement is excited such that, when subjected to a load, the bridge circuit will generate a related AC output voltage. The AC bridge circuit output voltage is then operationally amplified, demodulated and read by a digital indicator so as to measure with high precision the low-level output voltage from the bridge circuit arrangement as caused by a change in impedance of the transducive elements, in a fast-response manner.

BRIEF DESCRIPTION OF THE DRAWINGS

Although the features of this invention which are considered to be novel are expressed in the appended claims, further details as to preferred practices and as to further objects and features thereof may be most readily comprehended through reference to the following detailed description when taken in connection with the accompanying drawings wherein:

DETAILED DESCRIPTION OF THE PREFERRED EMBODIMENT

Figure 1:
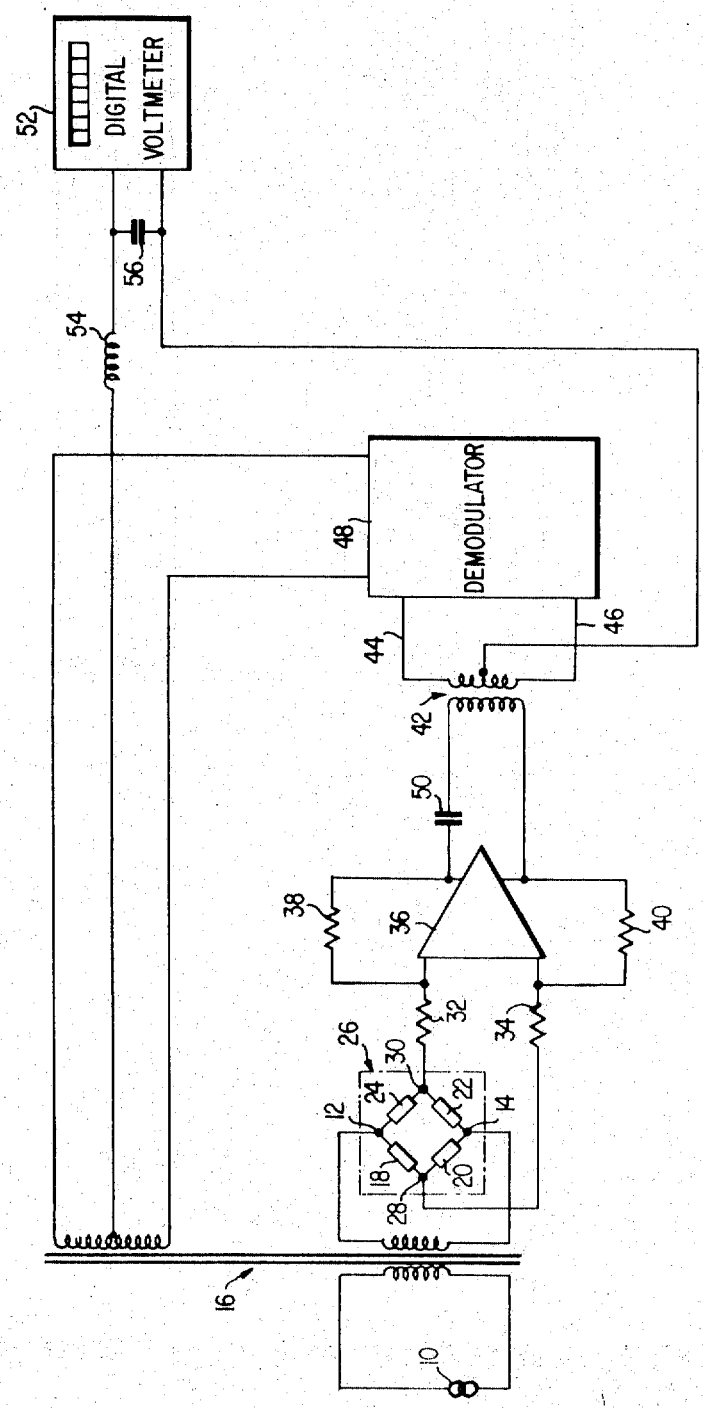
FIG. 1 is a schematic view of one embodiment of an AC-to-DC system for measuring low-level voltages with high accuracy according to the present invention.

Referring now to the drawings wherein like reference numerals designate identical or corresponding parts throughout the several views and more particularly to FIG. 1 thereof, one embodiment of a system for the high-accuracy measurement of low-level voltage signals according to the present invention is shown as including a conventional regulated oscillator 10 for applying an AC excitation voltage signal to the input terminals 12 and 14 of a typical Wheatstone bridge-circuit arrangement. A distribution transformer 16 is used to couple the AC excitation voltage signal from the regulated oscillator 10 to the bridge-circuit arrangement. It should be understood that, by way of example, each of the arms of the bridge circuit arrangement has been shown as including a transducive element mounted therein, such as the electrical strain-responsive elements 18, 20, 22 and 24, but that this is not necessarily always the case. Also, by way of example, the transducive electrical strain gage elements may be further mounted within a load cell 26 (shown by dotted lines) in such a fashion that when a load is applied to the load cell 26 the impedance value of the electrical strain-responsive elements 18, 20, 22 and 24 will change in such a manner as to unbalance the bridge-circuit arrangement and thereby cause an AC output voltage to be generated therefrom across output terminals 28 and 30 of the bridge-circuit arrangement. The output voltage so generated will be of an amount proportional to the weight of the load applied to the load cell 26. The output voltage of the bridge-circuit is then fed across dropping resistors 32 and 34 to the input of a conventional solid state differential input operational amplifier 36 which has a single ended output. Feedback resistors 38 and 40 are provided to insure that high-gain operational amplifier 36 will preserve a gain which is essentially independent of external influences. The AC output of the operational amplifier 36 is then transformer-coupled by a transformer 42 to the input terminals 44 and 46 of a highly linear and phase-sensitive solid state and conventional demodulator 48, for example one which is of the ring diode type. Additionally, a capacitor 50 may be provided at the output of the operational amplifier 36 to block any stray DC voltage signals that may be present at the input of the demodulator 48. Distribution transformer 16 is also used to supply the demodulator 48 with proper supply reference voltages. The purpose of the demodulator 48 is to convert the AC voltage signal input thereto to a DC voltage signal representative thereof, whereupon its value may be read, after proper filtering, upon a digital indicator, such for example as a conventional solid state digital voltmeter 52, to give a high-accuracy readout. The filter appearing at the output of the demodulator 48 is used to eliminate any ripple appearing in the demodulator output signal and, in the illustrated form, includes an inductor 54 and a capacitor 56 in a conventional L-section arrangement. The inductor 54 will prevent any change in magnitude of current, while the capacitor 56 will prevent any change in magnitude of voltage such that the combination thereof will provide a voltage input to the digital voltmeter 52 of a constant magnitude.

Figure 2:
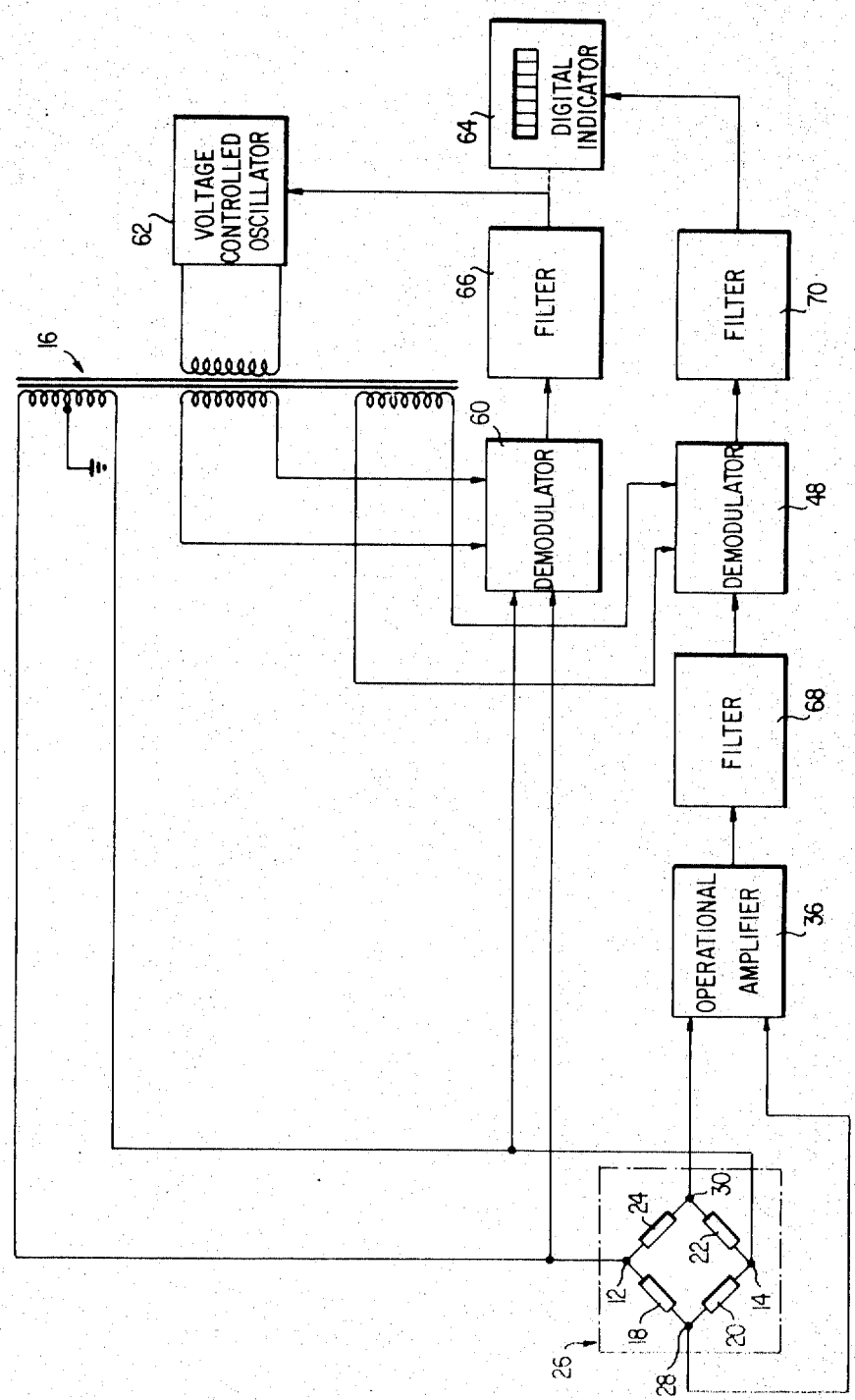
FIG. 2 is a schematic view of an alternative embodiment of an AC-to-DC system for measuring low-level voltages with high accuracy according to the present invention.

Referring now to FIG. 2, there is shown a system for the high-accuracy measurement of low-level voltage signals which is a variation of the embodiment described above with reference to FIG. 1. In particular, a second tracking demodulator 60 identical to that of the first demodulator 48 is used to control the voltage output of a conventional solid state voltage controlled oscillator 62 in such a fashion as to compensate for any voltage measurement error that could be caused by system lead resistance or demodulator operation. Alternatively, however, the oscillator 62 may be of the free-running type with the output of the second demodulator 60 being fed directly to the digital indicator 64 (as shown by the dotted lines) whereby the same will operate as a digital ratiometer. Here again, filter 68 is used to block any stray DC voltage at the input of the demodulator 48, while filters 66 and 70 may be conventional pi-section filters for eliminating ripple.

It should now be apparent that the system of the herein described invention allows for the accurate measurement of the low-level output voltages from a bridge-circuit arrangement having electrical strain-responsive elements in the arms thereof. It should also be apparent that while the invention has been described with particular reference to the measurement of the weight of a load applied to a load cell that it is not so limited and may be used for any type of strain gage application, such for example as for the measurement of pressure, torque, temperature or the like. Moreover, while the present invention has been described with particular reference to a single load cell, it should be understood that it is not so limited and that any number of load cells supporting a weighing platform or the like and connected in a plurality of bridge-circuit arrangements may also be used. Also, while the conventional solid state circuits have been described with reference to particular examples, it should be understood that they are not so limited and that other substitutions are equally available. For example, an operational-type amplifier may be substituted for the ring diode type demodulator.

Accordingly, it should be understood that the specific embodiments and practices herein described have been presented by way of disclosure rather than limitation, and that various modifications, combinations and substitutions may be effected by those skilled in the art without departure in spirit and scope from this invention and in its broader aspects and as set forth in the appended claims.

What I claim as new and desire to be secured by Letters Patent of the United States is:

1. A load-measuring system for displaying with high-accuracy measurements related to low-level output voltages of a strain-gage transducer bridge-circuit arrangement including at least one strain gage in one of the arms thereof, comprising regulated-oscillator means for applying an AC voltage to a given pair of joining arm points of said bridge-circuit arrangement; means operationally amplifying outputs from said bridge-circuit arrangement appearing at the other pair of joining arm points of said bridge-circuit arrangements, said outputs being caused by unbalance of said bridge-circuit arrangement due to a loading-induced change in impedance in said strain gage, said operationally amplifying means including a high-gain operational amplifier having feedback means preserving gain which is essentially independent of external influences, highly linear phase-sensitive demodulation means, means isolating the output of said operational amplifier from DC and coupling the isolated output of said operational amplifier to the input of said demodulation means, said demodulation means being responsive to the isolated outputs of said operationally amplifying means and converting the isolated outputs of said operationally amplifying means into DC voltages representative thereof; means filtering the DC output voltages of said demodulation means; and digital indicator means responsive to the filtered DC output voltages of said filtering means and characterizing the same to indicate loading of said transducer with high stability, speed of response, and accuracy.

2. A load-measuring system as set forth in claim 1, wherein said regulated oscillator means includes means transformer-coupling the output from said oscillator means to said given pair of joining arms of said bridge-circuit arrangement, wherein said isolating means includes means transformer-coupling the output of said operational amplifier to the input of said demodulation means, wherein said demodulation means is a ring-diode demodulator, wherein said means transformer-coupling the output from said regulated oscillator means couples said output from said oscillator means to said ring-diode demodulator as reference voltage therefor, and wherein said digital indicating means comprises a digital voltmeter.

3. A load-measuring system as set forth in claim 1 comprising a further highly linear phase-sensitive demodulation means responsive to said AC voltage applied by said regulated oscillator means and directly converting said AC voltage into DC signals representative thereof; and means controlling the responses of said digital indicator means in accordance with said DC signals from said further demodulation means.

4. A load-measuring system as set forth in claim 3 wherein said regulated oscillator means comprises an oscillator producing AC voltages related to DC control signals applied thereto, and wherein said controlling means includes means applying DC signals from said further demodulation means to said oscillator as control signals therefor and thereby controlling the levels of said AC voltage applied by said oscillator, whereby effects of lead resistance and demodulation imbalance are offset.

5. A load-measuring system as set forth in claim 3 wherein said controlling means includes means applying DC signals from said further demodulation means as a reference voltage to the input of said digital indicator means, whereby said digital indicator means is caused to operate as a digital ratiometer.

* * * * *